April 6, 1943.  F. R. KIMBROUGH  2,316,074
COMBINED CASTING AND STATIONARY FLOAT
Filed May 9, 1941
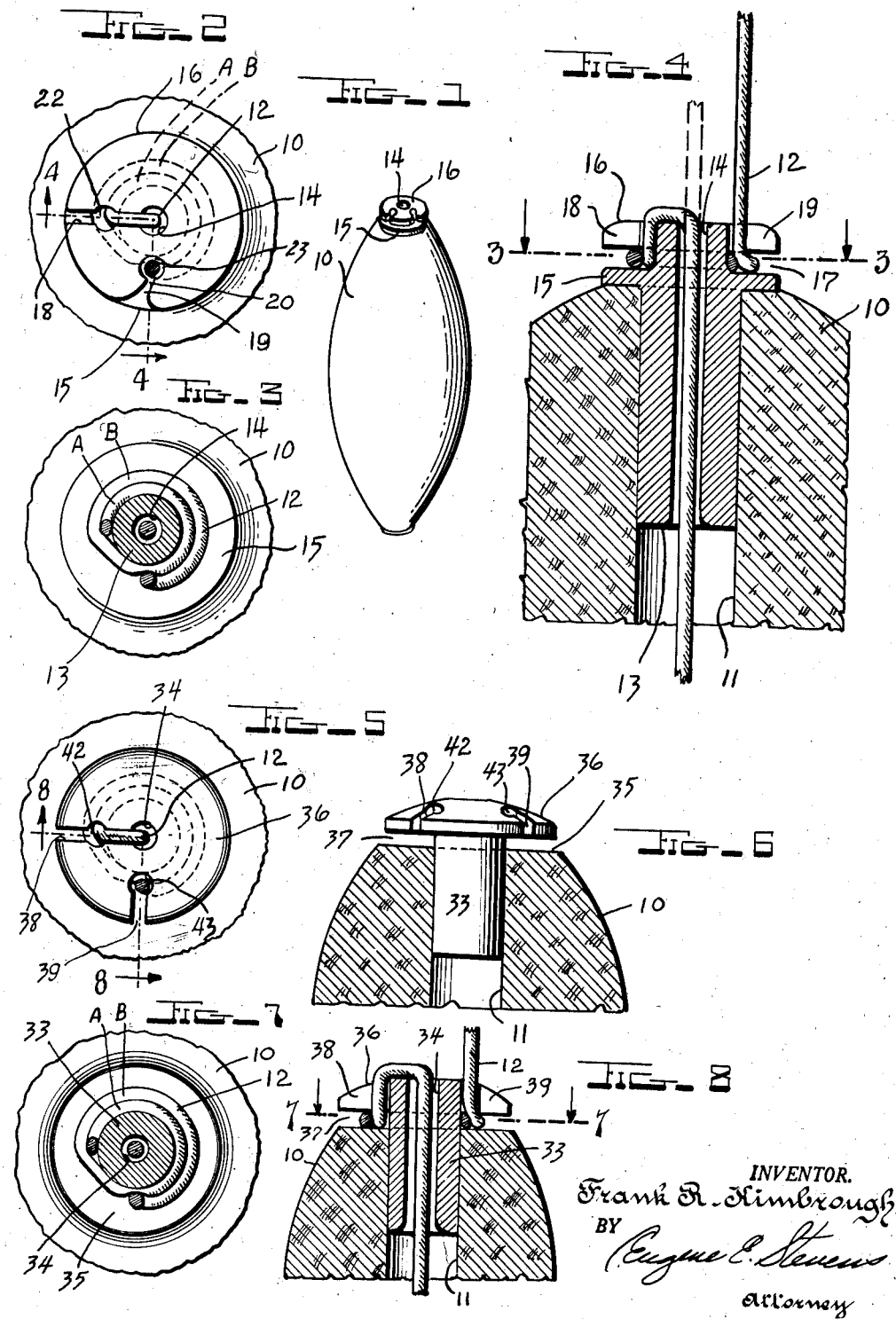
INVENTOR.
Frank R. Kimbrough,
BY
Eugene E. Stevens
Attorney Patented Apr. 6, 1943

2,316,074

UNITED STATES PATENT OFFICE 2,316,074

COMBINED CASTING AND STATIONARY FLOAT

Frank R. Kimbrough, Richmond, Va.

Application May 9, 1941, Serial No. 392,791

13 Claims. (Cl. 43—49)

My invention relates to combined casting and stationary floats for fishing and relates particularly to means for quickly and easily transforming a casting float into a stationary float for still fishing.

As is well known in the art, a casting float must be free running on the line to permit the hook to be reeled in to the tip of the rod. To accomplish this, it is customary to provide a knot or other small stop on the line the desired distance above the hook which will not pass through the bore of the float but which will pass through the line guiding eyes on the rod. Thus, the knot, which is above the float, automatically sets the hook a predetermined distance below the float after the cast but permits the hook to be reeled in substantially to the rod tip when a fish is hooked. On the other hand, when a float is used in still fishing with or without a rod, it is desirable to lock the float to the line at a predetermined distance from the hook. Such distance, as in casting, depends upon the depth at which the hook is to be located and as this depth will vary with the depth of the water, the type of fish sought, and other factors, it is desirable that the distance between the float and hook be readily variable.

With the foregoing in view, it is an object of my invention to provide novel means for quickly and easily locking a float to a line.

A further object is to provide a novel combined casting and stationary float.

A further object is to provide novel means for locking a float to a line which avoids the use of knots but which will not slip or jam and yet permits the prompt unlocking of line and float when it is desired to transform the stationary float to a casting float.

A further object is to provide a novel ferrule or bushing which is insertable in the bore of a float and which is itself bored to permit free passage of the line therethrough when the float is used as a casting float, said ferrule or bushing including an annular groove concentric to the bore of the ferrule or bushing in which the line may be wrapped and at least one substantially radial line locking slot adjacent said groove.

A further object is to provide a novel ferrule or bushing which is insertable in the bore of a float and which includes novel line locking means.

In the drawing:

In Fig. 1 is a perspective of a fishing float of known form and showing one form of the invention applied thereto;

Fig. 2 is an enlarged fragmentary plan view of the form of invention of Fig. 1;

Fig. 3 is a horizontal section taken on the plane of the line 3—3 of Fig. 4;

Fig. 4 is a vertical section taken of the planes of the line 4—4 of Fig. 2;

Fig. 5 is a view like Fig. 2 but showing a modification of the invention;

Fig. 6 is an elevation of the form of invention of Fig. 5;

Fig. 7 is a horizontal section taken of the plane of the line 7—7 of Fig. 8; and Fig. 8 is a vertical section taken on the planes of the line 8—8 of Fig. 5.

Referring specifically to the drawing, wherein like reference characters have been used throughout to designate like parts, the form of invention of Figs. 1–4 inclusive comprises any suitable form of float or bob 10 which has an axial bore 11 for the free passage of the line 12 therethrough. A ferrule or bushing 13 is fitted into the upper end of the bore 11 of the float and is secured therein in any suitable manner. The ferrule or bushing 13 is axially bored as at 14 for free passage of the line therethrough but the bore 14 is too small to permit a knot or like stop (not shown) to pass therethrough when the float is used as a casting float in the well known manner.

The ferrule or bushing 13 is provided with a pair of vertically spaced flanges 15 and 16 at its upper end which provide a groove 17 therebetween. The lower flange 15 is secured flush with the top of the float 10. The upper flange 16 is provided with a radial slot 18 which is enlarged at its inner end as at 22, the inner margin of the enlargement 22 being tangential with the inner wall of the groove 17. The upper flange 16 is provided also with a second slot 19 which is not radial but which is inclined towards the slot 18. The slot 19 is narrowed or reduced in diameter towards its inner end as at 20 and thereafter is enlarged as at 23. The inner border of the enlargement 23 is tangential to the inner wall of the groove 17. The slot 19 has a wide mouth to facilitate the entrance of the line 12 therein but the reduced portion 20 is narrower than the diameter of the line 12, whereby the latter must be forced past the narrow point 20 and into the enlargement 23.

In operation, when the device is used as a casting float, the line 12 extends straight through the bore 14 of the ferrule, as indicated in broken lines in Fig. 4. However, when the float is to be locked to the line, a portion of the line above the float is brought over the upper surface of the upper flange 16, passed downwardly through the radial slot 18 into the enlargement 22 thereof. Two turns A and B are now taken with the line 12 in groove 17 and the free end of the line is introduced into the second slot 19, forced past the narrow point 20 thereof and into the enlargement 23. The narrow point 20 prevents the line from accidently escaping from the enlargement 23 and maintains the free end of the line tightly against the inner turn A to lock the float at the selected point—see Figs. 2 and 3. Obviously, the greater the strain on the line, the tighter will be the grip of the turn B on the turn A so slippage is virtually impossible in use. At the same time, should it be desirable to change the setting of the float or to transform it to a casting float, it is a simple matter to force the free end of the line past the narrow point 20 of the slot 19 and thereafter unwrap the turns A and B. The float 10 is now free on the line 12 and the setting may be changed or the device used as a casting float.

In the form of invention disclosed in Figs. 5-8 inclusive, a ferrule or bushing 33, axially bored as at 34 is secured in the bore 11 of the float 10. The ferrule or bushing 33 is provided with a single flange 36 which is slightly spaced above the upper surface 35 of the float 10 to provide a concentric groove 37 therebetween. The flange 36 is provided with a pair of spaced and radial slots 38 and 39 having inner enlargements 42 and 43 respectively and whose inner walls are tangential with the floor of the groove 37—which in this instance is the extended periphery of the ferrule or bushing 33. Both of the slots 38 and 39 are slightly narrower than the thickness of the line, whereby it is necessary to force the line into and out of the enlargements 42 and 43 and accidental dislodgment of the line is prevented.

The operation of this form of the invention is the same as that of the first described form so need not be described in detail. By making both of the slots radial and identical this form of the invention may be readily used by either right or left handed persons, so the free end of the line may be seated either in enlargement 42 or in enlargement 43.

It should be noted (Figs. 4 and 8) that in both forms of the invention the outer boundaries of the enlargements and the under surfaces of the flanges 16 and 36 are so located that the inner turn A of the line must be compressed when the free end of the line is brought upwardly through the enlargements 23 and 43. Hence, even if there is no strain on the line, the float is frictionally locked in position.

In both forms of the invention, the two slots are located about 90° apart but it is obvious that this precise spacing need not be maintained although it is advantageous to have both slots located on the same half of the upper flange as then the float does not need to be turned in the hand to apply the line to both slots.

While I have shown radial slots on the form of invention of Figs. 5-8 and a radial and an inclined slot on the Figs. 1-4 form, it is obvious that either form of slot could be used on either form of invention. The ferrules or bushings 13 and 33 are preferably made of plastic to give lightness to the devices but, of course, may be made of any other suitable material.

While I have shown and described what are now thought to be the preferred forms of the invention, it is to be understood that the invention is susceptible of other forms and expressions. Consequently, I do not limit myself to the precise structures shown and described except as hereinafter claimed.

I claim:

1. A fishing float having an axial bore therethrough, a ferrule fixed in said bore at one end thereof, an axial bore through said ferrule, said ferrule having at least one radial flange on the outer end thereof in longitudinally spaced relation to the adjacent end of said float to provide a concentric groove, a pair of inwardly directed spaced slots in the edge of said flange at least one of said slots having an enlargement formed at its inner end, and at least a portion of said last slot outwardly of said enlargement having a diameter less than that of a fishing line adapted to be used with said float.

2. A fishing float having a passage for a fishing line extending therethrough, a bushing for the line carried by said float at one end of said passage, said bushing including a radial flange fixed to the adjacent end surface of said float, a second radial flange on said bushing outwardly spaced from said first flange to provide a concentric groove therebetween, and spaced line locking slots formed in the marginal edge of said second flange.

3. The structure of claim 2, one of said slots being radial to said passage and at least another slot being inclined towards said radial slot.

4. The structure of claim 13, means for retaining said line in at least one of said slots, and said line being adapted to be passed through one of said slots, be then given at least two turns around said bushing in said groove and then being led through said slot having said retaining means, said retaining means so located as to cause said line held thereby to bear on at least one inner turn of said line to lock the same.

5. The structure of claim 2, means for retaining said line in at least one of said slots, and said line being adapted to be passed through one of said slots, be then given at least two turns around said bushing in said groove and then being led through said slot having said retaining means, said retaining means being so located as to cause said line held thereby to bear on at least one inner turn of said line to lock the same.

6. A fishing float having a passage for a fishing line extending therethrough, a bushing for the line carried by said float at one end of said passage, said bushing including at least one radial flange providing a concentric groove therebelow, spaced line locking slots formed in the marginal edge of said flange, one of said slots being radial to said passage, and at least another slot being inclined toward said radial slot.

7. A fishing float having a passage for a fishing line extending therethrough, a bushing for the line carried by said float at one end of said passage, said bushing including at least one radial flange providing a concentric groove therebelow, spaced line locking slots formed in the marginal edge of said flange, at least one of said slots being radial to said passage, at least another slot being inclined toward said first slot, said last slot having a relatively wide mouth, a relatively large line receiving portion at its base, and a relatively narrow throat connecting said mouth and base to provide means for retaining the line in said base.

8. A fishing float for a fishing line, a bushing for said line carried by said float and having a free end extending outwardly thereof, a passage for said line through said float and bushing, said free end of said bushing having at least one radial flange in spaced relation to the adjacent end of said float to provide a concentric groove below said flange, at least one line-locking slot formed in the marginal edge of said flange, and said slot being diagonal to the marginal edge of said flange.

9. A fishing float for a fishing line, a bushing for said line carried by said float and having a free end extending outwardly thereof, a passage for said line through said float and bushing, said free end of said bushing having at least one radial flange in spaced relation to the adjacent end of said float to provide a concentric groove below said flange, at least one line-locking slot formed in the marginal edge of said flange, and said slot having a restricted portion intermediate its ends which is adapted to resist passage of the line thereby.

10. A fishing float for a fishing line, a bushing for said line carried by said float and having a free end extending outwardly thereof, a passage for said line through said float and bushing, said free end of said bushing having at least one radial flange in slightly spaced relation to the adjacent end of said float to provide a narrow concentric groove below said flange, at least one line-locking slot formed in the marginal edge of said flange, said slot having a restricted portion intermediate its ends which is adapted to resist passage of the line thereby.

11. The structure of claim 10, and said free end of said bushing having a second flange inwardly spaced from said first flange and abutting the adjacent end of said float.

12. A fishing float for a fishing line, a bushing for said line carried by said float and having a free end extending outwardly thereof, a passage for said line through said float and bushing, said free end of said bushing having at least one radial flange in spaced relation to the adjacent end of said float to provide a concentric groove below said flange, spaced line locking slots formed in the marginal edge of said flange, said slots having closed inner ends spaced from said passage through said bushing.

13. A fishing float for a fishing line, a bushing for said line carried by said float and having a free end extending outwardly thereof, a passage for said line through said float and bushing, said free end of said bushing having a single radial flange in spaced relation to the adjacent end of said float to provide a concentric groove therebetween said flange, spaced line locking slots formed in the marginal edge of said flange, said slots having closed inner ends spaced from said passage through said bushing.

FRANK R. KIMBROUGH.